May 3, 1960 M. ROY 2,935,246
SHOCK WAVE COMPRESSORS, ESPECIALLY FOR USE IN CONNECTION
WITH CONTINUOUS FLOW ENGINES FOR AIRCRAFT
Filed June 1, 1950

INVENTOR
MAURICE ROY
BY
Bailey, Stephens & Huttig
ATTORNEYS

United States Patent Office
2,935,246
Patented May 3, 1960

2,935,246

SHOCK WAVE COMPRESSORS, ESPECIALLY FOR USE IN CONNECTION WITH CONTINUOUS FLOW ENGINES FOR AIRCRAFT

Maurice Roy, Paris, France, assignor to Office National d'Etudes et de Recherches Aeronautiques (O.N.E.R.A.), Paris, France, a French society Application June 1, 1950, Serial No. 165,410

Claims priority, application France June 2, 1949

6 Claims. (Cl. 230—120)

The present invention relates to shock wave compressors, this term including, in the following specification and claims, all compressors having an at least partly axial flow, running at high speed, and in the axial flow portion of which at least a portion of the compression is due to the formation of shock waves between the blades of at least one set of blades (either stationary or movable) the front edges of which are struck by a stream flowing at supersonic speed. My invention is more particularly concerned with compressors for continuous flow engines (ram-jets, turbo-jets, etc.) for aircrafts.

The chief object of my invention is to provide a compressor of this kind which is better adapted to meet the requirements of practice than those used up to this time.

Preferred embodiments of my invention will be hereinafter described, with reference to the accompanying drawings, given merely by way of example and in which.

It will be supposed that my invention is applied to the construction of an aviation axial compressor of the shock wave type, the rotary element or elements of said compressor being preferably mounted directly on the turbine shaft of a continuous flow engine.

This device is provided with at least one set of distributing blades A and at least one set of diffusing blades B disposed downstream of set A and coaxially therewith, at least one of said set of blades being rotary and the front edges of the diffusing blades B being acted upon by a supersonic speed stream.

According to my invention, the flow passages between the respective blades 1 of the diffusing set B are so shaped that, in every passage of this set, a succession of shock waves is set up, the first of which $O_1$ is an oblique shock wave attached to the leading edge of a blade 1 and the last of which $O_p$ is a normal shock wave, said passage ending, downstream of the normal shock wave $O_p$ which marks the limit between the supersonic and subsonic fields, in a divergent portion $d$ acting as a diffuser.

It will be supposed first that the distributing set of blades A is a rotary set having a velocity U and that the diffuser set B is stationary.

Figure 2:
Figs. 2 and 3 are velocity diagrams relative respectively to the distributing and diffusing sets of blades of this compressor.

Fig. 2 is the velocity diagram relative to distributing set A. This diagram is made in such manner that the absolute velocity vector passes from initial value $V_1$ to final value $V'_1$, inclined on $V_1$ and preferably higher that it. $W_1$ and $W'_1$ represent the velocity of the fluid, at entry and at exit respectively, with respect to the rotor.

Furthermore, in order to obtain through this distributing set of blades A, which actually is an action wheel, a flow without drop or gain of pressure despite the unavoidable losses of energy in the quick deflection stream, it will be of interest to make said set A slightly helico-centrifugal, that is to say of a mean radius of rotation slightly greater at the exit than at the entry.

On the other hand, advantageously, starting is facilitated by providing, in every blade 2 of said set, a slot $2a$, so that said blade works like a conventional slotted wing.

It seems preferable to give a moderate incidence and a small curvature to the front portion of the blade (less developed than the rear portion) and a sharp curvature to its rear portion, the leading edge of which is partly covered by the trailing edge of the front portion.

I thus obtain a sharp deflection of the airstream lines without involving any appreciable modification of pressure during the flow through set A.

I will now consider the diffusing blade set B, which, as a matter of fact, has both a straightening and a diffusing action.

In the following description and claims, I will call "forward face" of a rotating blade, that turned toward the direction in which the blade is rotating, the other face of said blade being of course the "rearward face." In the case of stationary blading, the direction of the air entering the passages between the blades has both an axial and a tangential component and the direction of the tangential component is toward the "forward faces" of the blades.

Figure 1:
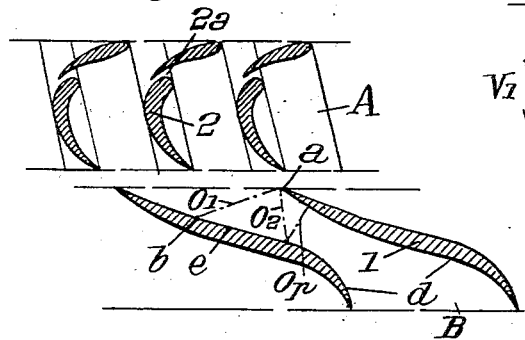
Fig. 1 shows, in developed cylindrical section at blade mid-height, the distributing and diffusing sets of blades of a shock wave compressor made according to my invention.

According to the embodiment illustrated by Fig. 1, I provide, on the rearward face $e$ of every blade, near the front thereof, a point $b$ of discontinuity in the curvature of said rearward face, this point being located and calculated in such manner that, under normal working conditions, it sets up an oblique shock wave $O_1$ which starts from the leading edge $a$ of the blade facing that above considered, from which leading edge starts another oblique shock wave $O_2$ (located at the rear of the preceding one) which, due to the slowing down that takes place in this front portion, is followed by a normal shock wave $O_p$ which marks the limit between supersonic flow (in the convergent portion of the passage) and subsonic flow (in the divergent rear portion $d$).

Figure 3:

The diagram of Fig. 3 shows the entry velocity $V_2$ (equal to $V'_1$) and the exit velocity $V'_2$ relatively to stator B.

It should be noted that, if the absolute velocity $V_2$ is sufficient, one or several reflected oblique shock waves may be produced downstream of shock wave $O_2$, before the normal shock wave $O_p$ is formed.

Figure 4:
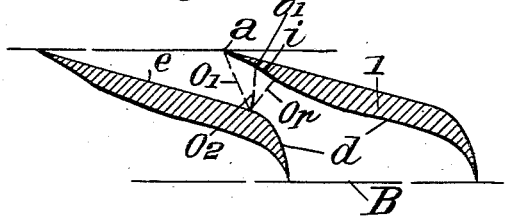
Fig. 4 shows a modification of the diffusing set of blades of said compressor.

But I may also, as shown by Fig. 4, arrange the surfaces of blades 1 so as to form in every passage three successive shock waves (two oblique ones $O_1$ and $O_2$ followed by a normal one $O_p$) which converge toward a point of the rearward face $e$ of each blade located at the beginning of the portion $d$ of the passage which acts as a diffuser, the oblique shock waves $O_1$ and $O_2$ issuing respectively from the leading edge $a$ of the next blade and from a point $b_1$ of the frontward face of this blade, where there is a discontinuity in the curvature of the profile thereof.

This arrangement has the advantage of giving deviations of the stream always in the same direction when passing the pressure zone limits constituted by shock waves $O_1$, $O_2$ and $O_p$, whereby vector $V_2$ can gradually be given its exit value $V'_2$.

Figure 5:
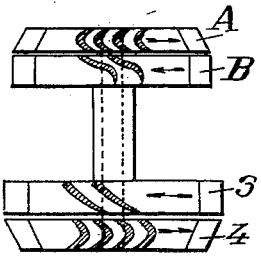
Fig. 5 is a diagram showing an embodiment of my invention in which both of the sets of blades rotate in opposed directions.

It will now be supposed that, according to another feature of my invention, both of the blade sets A and B are rotated in opposed directions, which can be obtained in a very simple manner as shown by Fig. 5 by directly coupling said blade sets respectively to the wheels 3 and 4, rotating in opposed directions, of a gas turbine.

This solution has the advantage of making it possible to obtain:

Either the same supersonic relative speed at the entry of the straightening and diffusing set B for speeds of revolution of sets A and B lower than that of set A when set B was stationary;

Or, if the speeds of revolution of sets A and B are substantially equal to that of set A in the first case above considered, a greater number of shock waves in set B, with shock waves of higher compression and greater deflection, which permits of correspondingly reducing the complementary deflection achieved by the end portion $d$ acting as a diffuser.

In the case now considered, where the two sets of blades are rotating in opposed directions, I may adopt for the straightening and diffusing set of blades one of the arrangements above considered with reference to Figs. 1 and 4.

Figure 6:
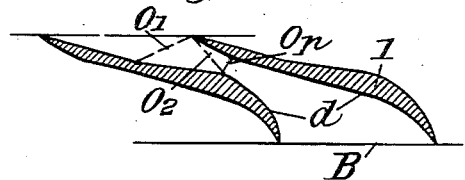
Fig. 6 shows an embodiment of the diffusing set of blades of such a compressor.
Figure 8:
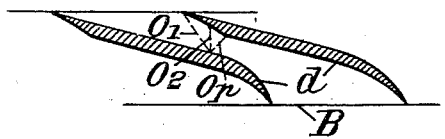
Fig. 8 illustrates a modification of construction of such a diffuser.

Figs. 6 and 8 show two embodiments corresponding respectively to those illusrated by Figs. 1 and 4, the wave trains having in both cases the same shape with the difference that in this case the flow is relative instead of being absolute.

Figure 7:
Fig. 7 is the velocity diagram of the set of blades illustrated by Fig. 6.

Fig. 7 shows the velocity diagram relative to the blade arrangement illustrated by Fig. 6. It will be noted that on this diagram the total deflection of the relative flow (passage from $W_2$ to $W'_2$) is smaller than the total deflection corresponding to the case of blade set B being stationary (passage from $V_2$ to $V'_2$).

According to another feature of my invention, I provide, on every blade of set B, at the place of at least one discontinuity in the profile thereof, means for blowing or sucking the boundary layer so as to stabilize the shock wave which touches this discontinuity.

Figure 9:
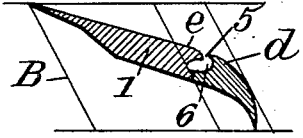
Figs. 9 and 10 show, in sectional view, two modifications in the construction of blades for shock wave compressors provided with means for stabilizing shock waves.

For this purpose, I may, for instance, as shown by Fig. 9, provide, on the rearward face $e$ of a blade, a suction slot 5 the rear edge of which coincides with the beginning of the diffuser portion $d$, said slot opening, on the inside of the blade, into a recess 6 connected to a manifold itself in communication with the suction of a special fan.

In the case of an aviation jet engine, the air thus sucked in on the rearward face of the blade may be used for cooling purposes, for instances for cooling turbine bearings or discs.

It should be noted that, in order to facilitate the machining of such slotted blades, they may be made of two adjoining elements the sections of which are differentiated on the drawing by cross-hatchings of different inclinations.

Figure 10:
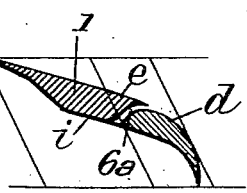

I may also, according to a modification illustrated by Fig. 10, directly connect the rearward face $e$ and the forward face $i$ of a blade by means of a slot which then exerts a blowing action due to the fact that the pressure prevailing on the forward face is higher than that on the rearward face. Slot $6a$ should then open obliquely in the upstream direction at the beginning of diffuser $d$, that is to say in a region where at least two shock waves converge. In this case also, the blade may be formed by two independent elements assembled together.

The chief advantages of compressors according to my invention consist in the rise of pressure they achieve and the stability of the shock waves produced in the diffusing sets of blades.

Of course, the features above described might be applied to several stages, either consecutive or not, of a multiple stage compressor.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A compressor including a casing structure, two coaxial cylindrical members mounted in said casing adjacent to each other in the axial direction and defining with said casing an annular flow duct for the gaseous medium to be compressed, at least one of said members being rotatable in said casing, blades carried by the downstream member and extending across said flow duct to form between them a plurality of passages, guide vanes carried by the upstream member and extending across said flow duct upstream of said blades and arranged to guide said medium, fed thereto at a predetermined velocity, to give it as it leaves said vanes a velocity represented by a given vector, each blade of the downstream member comprising on the rearward face thereof a substantially flat area extending from its leading edge and parallel to the vector which is the resultant of the above mentioned vector and of a vector representing the peripheral velocity of said upstream member at working speed with reference to said downstream member, the velocities represented by the two last mentioned vectors being such that the resultant velocity is supersonic, the wedge angle between the two faces of each blade which start from the leading edge thereof being acute, the fore part of each of said passages being convergent and the rear part divergent in the direction of the gaseous medium flow, with a restricted throat between said last mentioned parts substantially aligned with the velocity represented by said resultant vector, one of the confronting faces of each of said passages in the convergent part thereof being provided with at least one sharp angular corner capable of generating a weak shock wave oblique to said resultant vector and striking the other of said confronting faces ahead of said throat, and the leading edge of the blade the forward face of which forms one of the walls of said passage being capable of generating a second weak shock wave, oblique to said resultant vector and extending frontwardly from said last mentioned leading edge to the rearward face of said first mentioned blade at a point thereof in the region of said throat and the divergent shape of the rear part of said passage being capable of giving by itself a normal shock wave in the region of said throat.

2. A compressor according to claim 1 further including boundary layer sucking means on the rearward face of every blade.

3. A compressor according to claim 1 further including boundary layer blowing means on the rearward face of every blade.

4. A compressor according to claim 1 further including means for rotating both of said members in opposed directions, the sections of the guiding vanes of the upstream member having sections similar to those of a slotted wing.

5. A compressor including a casing structure, two coaxial cylindrical members mounted in said casing adjacent to each other in the axial direction and defining with said casing an annnular flow duct for the gaseous medium to be compressed, at least one of said members being rotatable in said casing, blades carried by the downstream member and extending across said flow duct to form between them a plurality of passages, guide vanes carried by the upstream member and extending across said flow duct upstream of said blades and arranged to guide said medium, fed thereto at a predetermined velocity, to give it as it leaves said vanes a velocity represented by a given vector, each blade of the downstream member comprising on the rearward face thereof a substantially flat area extending from its leading edge and parallel to the vector which is the resultant of the above mentioned vector and of a vector representing the peripheral velocity of said upstream member at working speed with reference to said downstream member, the velocities represented by the two last mentioned vectors being such that the resultant velocity is supersonic, the wedge angle between the two faces of each blade which start from the leading edge thereof being acute, the fore part of each of said passages being convergent and the rear part divergent in the direction of the gaseous medium flow, with a restricted throat between said last mentioned parts substantially aligned with the velocity represented by said resultant vector, the rearward face of each of said blades having, at the rear of said flat area thereof, at least one sharp angular corner capable of generating a weak shock wave oblique to said resultant vector and extending rearwardly from said sharp corner to at least substantially the leading edge of the next blade and this last mentioned leading edge being capable of generating a second weak shock wave oblique to said resultant vector and extending from said last mentioned leading edge to the suction rearward face of said first mentioned blade at a point thereof in the region of said throat, and the divergent shape of the rear part of said passage being capable of giving by itself a normal shock wave in the region of said throat.

6. A compressor including a casing structure, two coaxial cylindrical members mounted in said casing adjacent to each other in the axial direction and defining with said casing an annular flow duct for the gaseous medium to be compressed, at least one of said members being rotatable in said casing, blades carried by the downstream member and extending across said flow duct to form between them a plurality of passages, guide vanes carried by the upstream member and extending across said flow duct upstream of said blades and arranged to guide said medium, fed thereto at a predetermined velocity, to give it as it leaves said vanes a velocity represented by a given vector, each blade of the downstream member comprising on the rearward face thereof a substantially flat area etxending from its leading edge and parallel to the vector which is the resultant of the above mentioned vector and of a vector representing the peripheral velocity of said upstream member at working speed with reference to said downstream member, the velocities represented by the two last mentioned vectors being such that the resultant velocity is supersonic, the wedge angle between the two faces of each blade which start from the leading edge thereof being acute, the fore part of each of said passages being convergent and the rear part divergent in the direction of the gaseous medium flow, with a restricted throat between said last mentioned parts substantially aligned with the velocity represented by said resultant vector, the forward face of each of said blades having, in the convergent part of said passages, two sharp angular corners, one of which is constituted by the leading edge of said blade, said sharp corners being capable respectively of generating two weak shock waves oblique to said resultant vector and which extend from said sharp angular corners both frontwardly to the rearward face of the preceding blade in the region of said throat, and the divergent shape of the rear part of said passage being capable of giving by itself a normal shock wave in the region of said wave.

References Cited in the file of this patent

UNITED STATES PATENTS

| | | |
|---|---|---|
| 853,363 | Holzwarth | May 14, 1907 |
| 2,166,823 | Rosenlocher | July 18, 1939 |
| 2,201,099 | Roe | May 14, 1940 |
| 2,344,835 | Stalker | Mar. 21, 1944 |
| 2,378,372 | Whittle | June 12, 1945 |
| 2,405,768 | Stalker | Aug. 13, 1946 |
| 2,406,499 | Jandasek | Aug. 27, 1946 |
| 2,435,236 | Redding | Feb. 3, 1948 |
| 2,501,614 | Price | Mar. 21, 1950 |
| 2,579,049 | Price | Dec. 18, 1951 |
| 2,597,510 | McBride | May 20, 1952 |
| 2,628,768 | Kantrowitz | Feb. 17, 1953 |
| 2,659,528 | Price | Nov. 17, 1953 |
| 2,689,681 | Sabatiuk | Sept. 21, 1954 |

FOREIGN PATENTS

| | | |
|---|---|---|
| 479,427 | Great Britain | Jan. 31, 1938 |